Aug. 8, 1939.   J. C. PATERSON   2,168,419
CONVEYER
Filed March 14, 1938   3 Sheets-Sheet 1
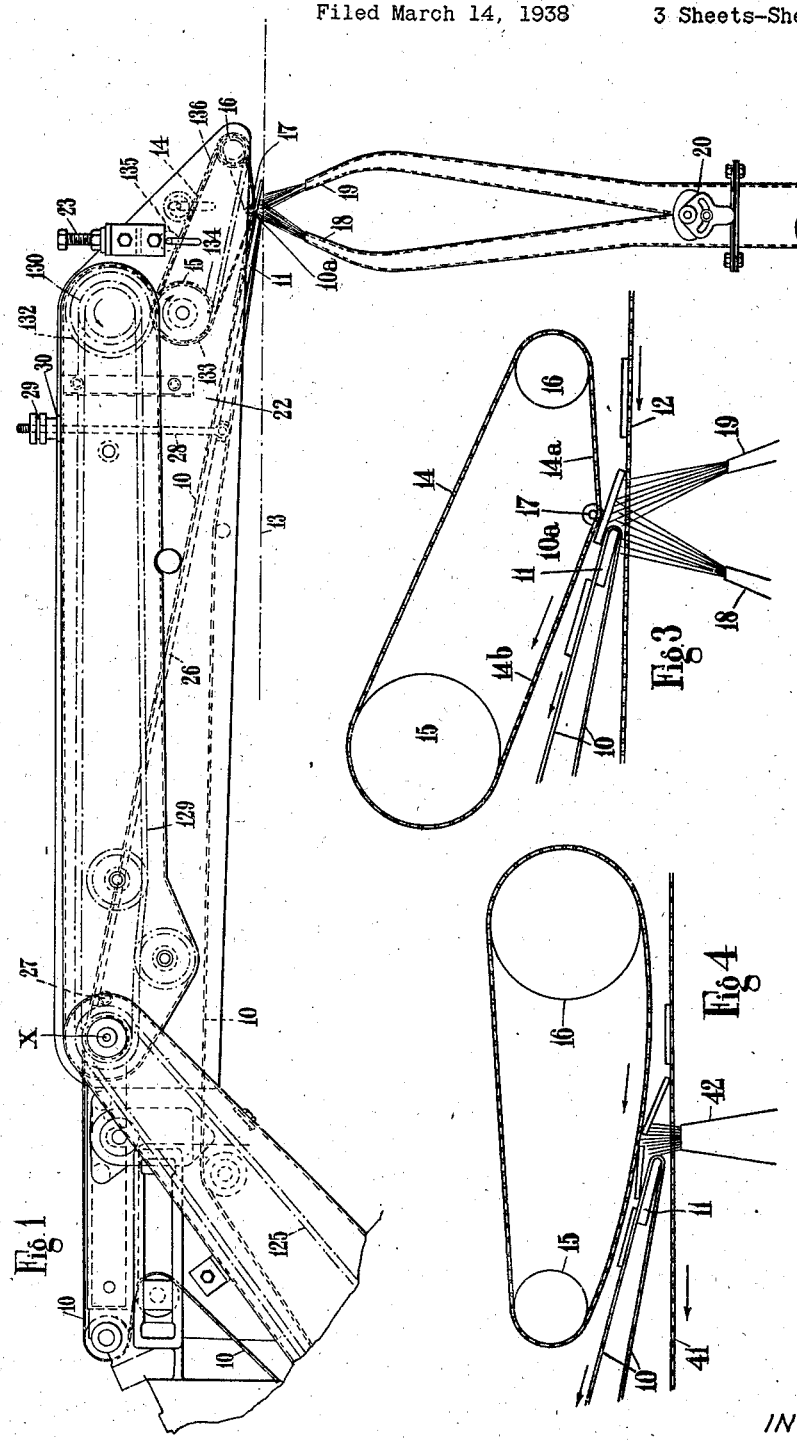
INVENTOR
JOHN CURRIE PATERSON
BY
ATTORNEY Aug. 8, 1939.  J. C. PATERSON  2,168,419
CONVEYER
Filed March 14, 1938  3 Sheets-Sheet 2
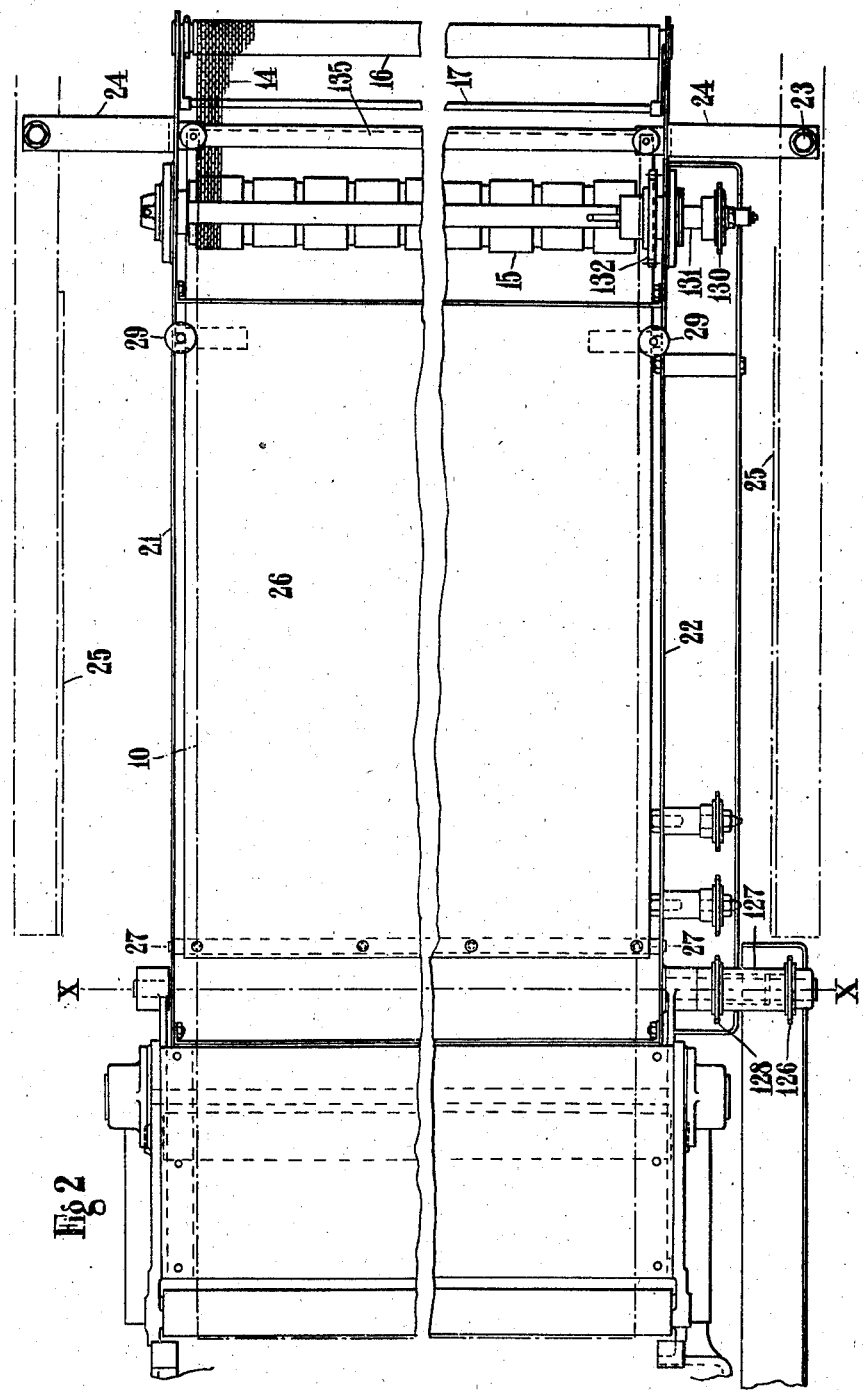
INVENTOR
JOHN CURRIE PATERSON
BY George B. Willcox
ATTORNEY Aug. 8, 1939.  J. C. PATERSON  2,168,419
CONVEYER
Filed March 14, 1938   3 Sheets—Sheet 3

INVENTOR
JOHN CURRIE PATERSON
BY *George R. Willcox*
ATTORNEY

Patented Aug. 8, 1939

2,168,419

UNITED STATES PATENT OFFICE 2,168,419

CONVEYER

John Currie Paterson, Peterborough, England, assignor to Baker Perkins Company Inc., Saginaw, Mich.

Application March 14, 1938, Serial No. 195,741
In Great Britain March 25, 1937

10 Claims. (Cl. 198—20)

This invention relates to conveyers and is especially applicable to endless band or travelling surface or tray conveyers which may be conveniently hereinafter referred to under the general term "conveyers". The invention is more particularly concerned with the transporting or conveyance of biscuits, dough shapes and like articles, and will be described hereinafter for convenience with reference to biscuits, although the invention is not limited in this respect.

An object of the invention is to provide improved means for removing biscuits from one conveyer and transferring them to another conveyer or other suface.

The invention consists in removing biscuits from one conveyer and transferring them to another conveyer or surface by lifting the biscuits from the first conveyer by an air blast and supporting them thereby against the under side of a superposed travelling surface or conveyer adapted to deliver them to the second conveyer or other surface.

According to one form an air-pervious endless transfer conveyer is mounted above discharge and receiving conveyers, and an air blast extending transversely of the conveyers is adapted to lift the biscuits as they arrive at the upward current of air and hold them against the under surface of the transfer conveyer which carries the attached biscuits forward so that they may be deposited upon the receiving conveyer.

The invention may be employed in association with and for the removal of biscuits from endless pervious conveyers, such as those made of wire mesh, or for the removal of biscuits from pervious trays or "wires" carried by chain or other conveyers. Furthermore, the invention may be applied in connection with impervious conveyers either by deflecting the conveyer to enable the air blast to act under the biscuits or by directing the blast so that it is turned by the conveyer surface to afford a levitating action upon the biscuits.

In the accompanying diagrammatic drawings—

Figure 5:
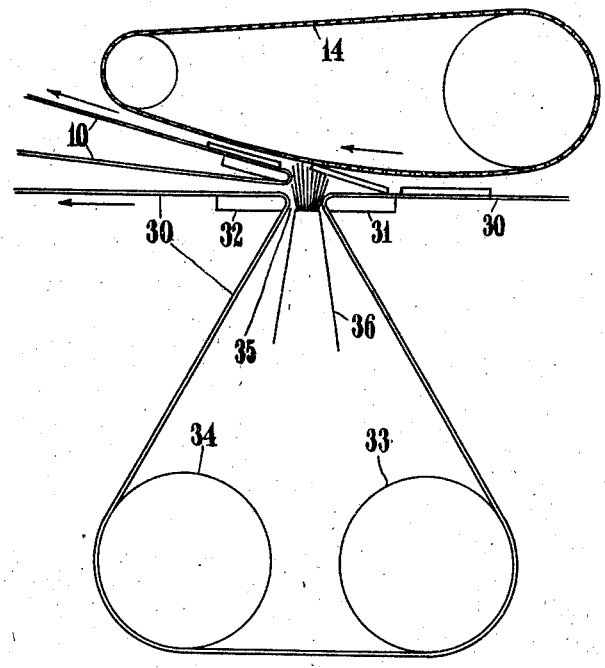
Figure 6:
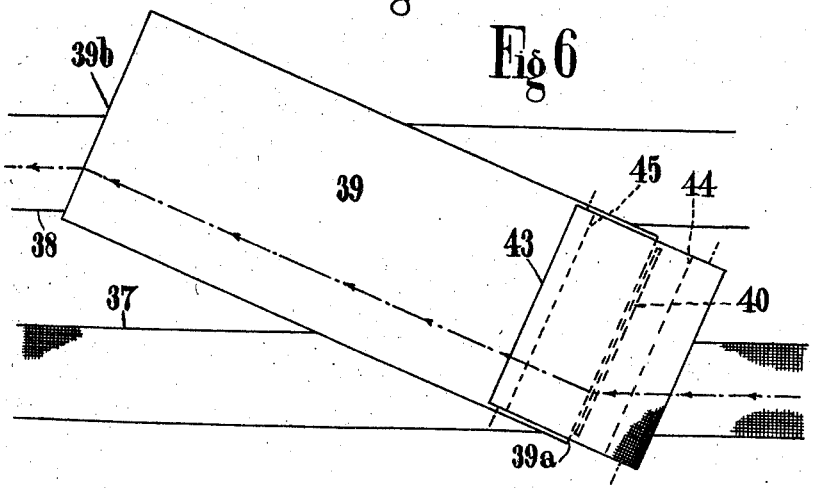

Figures 1 and 2 are elevation and plan illustrating the application of the invention in connection with a wire tray conveyer, Figure 3 is a view to a larger scale of the biscuit transfer zone of the apparatus shown in Figures 1 and 2, Figure 4 is a view similar to Figure 3 illustrating the application of the invention to an endless wire band conveyer, Figure 5 is a side view showing the application of the invention to an impervious conveyer, Figure 6 is a plan showing the application of the invention to the transfer of biscuits from one conveyer to another arranged parallel thereto and substantially in the same horizontal plane.

In carrying the invention into effect according to one convenient mode as applied to the transfer of biscuits from a pervious endless band conveyer such as the "wires" of a tray conveyer to a second "receiving superposed conveyer", the receiving conveyer 10 is of endless band form and has its receiving end 10a bent round a knife edge 11 located in close proximity to but spaced from the upper surface of the pervious discharging conveyer or "wire" 12 (Figure 3) which moves through the path 13 (Figure 1), the arrangement being such that the upper lap of the receiving conveyer 10 as it passes around the knife edge 11 travels at a suitable incline and has a component of movement in the direction of that of the pervious biscuit conveyer 12.

In the plant illustrated in Figures 1 to 3, the biscuit conveyer is in the form of pervious baking trays or "wires" mounted upon an endless chain conveyer the upper lap of which carries the "wires" through the path 13 (Figure 1).

In the region including the knife edge 11 of the receiving conveyer 10 and that portion of the discharge conveyer in front thereof, a transfer conveyer 14 is mounted. This conveyer consists of an endless pervious band or wire mesh supported on a pair of rolls 15 and 16 over the region referred to above. One or both of the rolls 15 and 16 may be driven and a freely supported guide roller or deflecting bar 17 is provided for the lower lap so that one portion 14a thereof is adapted to travel approximately parallel with the discharging conveyer 12 while an adjacent portion 14b travels approximately parallel with the upper inclined lap of the receiving conveyer 10.

Beneath the discharge conveyer 12 and on either side of the knife edge 11 of the receiving conveyer 10 a pair of nozzles 18, 19 is provided. Each nozzle is elongated to span the width of the conveyer, or may comprise a plurality of small nozzles which are aligned transversely of the conveyer. The nozzles are connected with a supply of air under pressure so that a pair of elongated air blasts are directed upwardly through the wire or other mesh of the discharge conveyer to lift or float the biscuits against the travelling lower lap of the transfer conveyer 14.

The nozzles may be arranged to spread the lifting air over a zone extending transversely and longitudinally and certain supplementary nozzles may be provided to maintain the biscuits against the transfer conveyer a short distance after they have passed vertically over the position of the knife edge 11 of the receiving conveyer. As the biscuits travel out of the zone of influence of the air they will be automaticaly released from the transfer conveyer and will be deposited upon the receiving conveyer 10 and carried away thereby.

The necessity of providing a pair of nozzles 18, 19 arises due to the fact that the wires 12 are provided with a central bar by which they are suspended on the chain conveyer. This bar as it passes the discharge zone would mask certain biscuits and might prevent their discharge. Where no transverse bars or other masking elements are present, as for example where the discharge conveyer is in the form of an endless wire mesh band 41, see Figure 4, a single nozzle 42 or row of nozzles directing the air blast vertically may be provided. An adjustable flap 20 (Figure 1) is provided for the purpose of adjusting or equalising the pressures in the nozzles 18 and 19.

The mounting for the transfer conveyer 14 may be adjustable so that the spacing interval between its lower lap and the associated discharging and receiving conveyers may be varied or adjusted and the knife edge of the receiving conveyer may also be adjusted with respect to the discharging conveyer as regards height and longitudinally.

For this purpose the transfer conveyer 14 and the associated part of the receiving conveyer are carried by plates 21 and 22 which are pivotally mounted on the axis x—x. Adjustment of the transfer conveyer is effected by the screws 23 which are carried by brackets 24 fixed to the plates 21 and 22, the screws 23 bearing upon side frames 25 of the machine. The knife edge 11 is formed by or fixed upon a plate 26 which is pivotally mounted at 27 in the plates 21 and 22. Adjustment of the plate is effected by the provision of links 28 which are connected to the plate 26 and are provided with nuts 29 which bear upon suitable parts of the plates 21 and 22.

The receiving conveyer 10 is driven in known manner by a roll not shown, upon the shaft of which a sprocket is mounted and from which a drive is imparted by a chain 125 to a sprocket wheel 126 mounted upon a sleeve shaft 127. A second sprocket wheel 128 on the shaft 127 is coupled by a chain 129 to a sprocket 130 on a shaft 131. The shaft 131 carries a gear wheel 132 meshing with a gear wheel 133 by which the roll 15 for the transfer conveyer is driven. At the other end of the roll 15 a sprocket wheel 134 is provided by which the roll 16 of the transfer conveyer is driven through a chain 136. The tension of the transfer conveyer is adjusted by a guide roll 135 which is vertically adjustable and bears upon the upper lap of the conveyer.

In both of the cases referred to above the knife edge 11 of the receiving conveyer 10 in conjunction with the air blast operates progressively to strip the biscuits from the pervious surface 12 or 41 and transfer them to that of the receiving conveyer.

In some cases it may be possible to eliminate the roll 17 and allow the lower lap of the transfer conveyer 14 to hang freely as indicated in Figure 4.

Where an alternative course is desired for the biscuits carried by an impervious conveyer, see Figure 5, the band 30 of the latter is bent over a pair of opposed knife edges 31, 32 and arranged in a bight under a roller of large diameter or around two rollers 33, 34 so that a transverse slot 35 is formed in the conveying surface between the opposed knife edges. Below this slot an elongated nozzle 36 or a series of nozzles is located so as to afford an air blast adapted to lift biscuits as they proceed over the first knife edge and press them against a superposed transfer conveyer 14 which is adapted in turn to deposit the biscuits on a receiving conveyer 10 after the manner described above.

When it is desired that the biscuits should follow a rectilinear path upon the discharging conveyer 30, the supply of air to the nozzles 36 is cut out when the biscuits will be propelled by the travelling band of the discharge conveyer from one knife edge 31 to the other 32 over the air blast slot 35. If desired, instead of cutting out the air blast entirely its strength will be moderated so that it is just sufficient to assist the biscuits in bridging the slot 35.

While the invention is more commonly applicable to conveyers in tandem the invention may be applied to cases in which the direction of travel is changed, or to the transference of biscuits from one conveyer to another which may be lying at the side of the first or discharging conveyer and parallel thereto or at an angle. For example, see Figure 6, assuming that it is desired to transfer biscuits from a wire band conveyer 37 to another endless conveyer 38 lying parallel and to one side of the conveyer 37 an intermediate conveyer 39 is provided one end 39a of which is disposed over and at an angle to the conveyer 37 while the other end 39b lies at a corresponding angle over the second conveyer 38 to which the biscuits are to be transferred.

In front of the inclined edge 39a of the intermediate conveyer 39 and below the first conveyer an air blast nozzle or slot 40 or a transverse series thereof is located at an angle corresponding with that of the intermediate conveyer 39. Associated with the air nozzle and extending over the adjacent end of the intermediate conveyer a wire mesh transfer conveyer 43 is mounted upon rolls 44 and 45 and driven by any suitable means. The air blast lifts the biscuits off the first conveyer 37 and holds them against the transfer conveyer 43 while they are carried thereby over the intermediate conveyer 39 and deposited thereupon. The intermediate conveyer discharges the biscuits according to known practice to the second conveyer 38.

While in the forms described above the pervious conveying elements are formed of wire mesh it will be appreciated that any other suitable air-pervious material may be employed.

Where in this specification the term "air blast" is used it is to be understood that such is not created by vacuum means but one from a superatmospheric pressure source.

I claim—

1. In the transporting of articles of the character described transferring the articles from one conveyer to another surface by lifting the articles from the first conveyer by an air blast and supporting them thereby against the under side of a superposed travelling surface which delivers them to the second surface.

2. Means for transferring articles of the character described from one surface to another, comprising a discharge conveyer, a receiving conveyer, an air-pervious endless transfer conveyer mounted above the discharge and receiving conveyers, and air blast means for lifting articles from the discharge conveyer and holding them against the under surface of the said transfer conveyer which carries them forward for deposit on the receiving conveyer.

3. Means for transferring articles of the character described from one conveyer surface to another, comprising a discharge conveyer of air-pervious material, a receiving conveyer, an air-pervious endless transfer conveyer mounted above the discharge and receiving conveyers, and air blast means mounted below said discharge conveyer for passing an air blast through said discharge conveyer to lift articles therefrom and hold them to the under surface of the transfer conveyer which carries them forward for deposit on the receiving conveyer.

4. Means for transferring articles of the character described from one conveyer surface to another, comprising a discharge conveyer of air-pervious material, a receiving conveyer, a transfer conveyer of air-pervious material mounted above the discharge and receiving conveyers, a pair of nozzles mounted below said discharge conveyer and inclined towards one another, and means for supplying air under pressure through said nozzles, whereby air blasts are directed upwardly through the discharge conveyer to lift the articles therefrom into contact with the travelling surface of the transfer conveyer from which they are deposited on to the receiving conveyer when moved from the influence of the air blasts.

5. Means for transferring articles of the character described from one conveyer surface to another, comprising a discharge conveyer, a receiving conveyer at an angle to said discharge conveyer, an air-pervious endless transfer conveyer mounted above the discharge and receiving conveyers, deflecting means associated with the lower lap of said transfer conveyer for guiding the lower lap into two portions substantially parallel to the discharge and receiving conveyers respectively, and air blast means for lifting articles from the discharge conveyer into contact with the lower lap of the transfer conveyer which carries them forward out of the zone of said air blast means for deposit upon the receiving conveyer.

6. Means for transferring articles of the character described from one conveyer surface to another, comprising a discharge conveyer of impervious material, a receiving conveyer, an air-pervious endless transfer conveyer mounted above the discharge and receiving conveyers, means for deflecting a portion of the discharge conveyer, and air blast means operative adjacent the deflected portion of the discharge conveyer for lifting articles from the latter and holding them against the underside of the transfer conveyer which carries them forwardly for deposit on the receiving conveyer.

7. Means for transferring articles of the character described from one conveyer surface to another, comprising an impervious discharge conveyer, a receiving conveyer, an air-pervious endless transfer conveyer mounted above the discharge and receiving conveyers, a pair of opposed knife edges and a roller arranged below said opposed knife edges, the impervious discharge conveyer being bent over the opposed knife edges and arranged in a bight under the said roller to form a transverse slot in said discharge conveyer, and air blast means operative through said transverse slot in the discharge conveyer for lifting articles from the latter and holding them against the under side of the transfer conveyer which carries them out of the zone of said air blast means for deposit on the receiving conveyer.

8. Means for transferring articles of the character described from one conveyer to another comprising, a discharge conveyer, a receiving conveyer, an air-pervious endless transfer conveyer mounted above the discharge and receiving conveyers, said receiving conveyer and said transfer conveyer being arranged at an angle to the discharge conveyer, air blast means for lifting articles from the discharge conveyer and holding them against the under surface of the transfer conveyer which carries them forwardly out of the zone of the air blast means for deposit on the receiving conveyer, and a second receiving conveyer arranged parallel to the discharge conveyer for receiving articles delivered from the first receiving conveyer.

9. Means for transferring articles of the character described from one conveyer to another, comprising a discharge conveyer consisting of a series of air-pervious trays carried by chains, a receiving conveyer located above the discharge conveyer at an angle thereto, an endless air-pervious transfer conveyer mounted above the discharge and receiving conveyers, deflecting means associated with the lower lap of said transfer conveyer to cause adjacent portions thereof to travel substantially parallel to the discharge and receiving conveyers respectively, and air blast means comprising a pair of nozzles located below the discharge conveyer at an angle to one another and transversely of the discharge conveyer for lifting articles from the air-pervious trays into contact with the lower lap of the transfer conveyer which carries them over the receiving conveyer and out of the zone of the air blast means so that they are deposited on the receiving conveyer.

10. Means for transferring articles of the character described from one conveyer surface to another, comprising a discharge conveyer, a receiving conveyer adjustably mounted above said discharge conveyer, an air-pervious transfer conveyer adjustably mounted above the discharge and receiving conveyers, and means creating an air blast across the width of the discharge conveyer for lifting articles from the discharge conveyer as they move into the air blast and holding them against the travelling under surface of the transfer conveyer which carries them out of the zone of the air blast for deposit on the receiving conveyer.

JOHN CURRIE PATERSON.